United States Patent
Isohata

(10) Patent No.: US 6,885,909 B2
(45) Date of Patent: Apr. 26, 2005

(54) NUMERICAL CONTROLLER

(75) Inventor: Shigeru Isohata, Hachioji (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/407,331

(22) Filed: Apr. 7, 2003

(65) Prior Publication Data

US 2003/0191553 A1 Oct. 9, 2003

(30) Foreign Application Priority Data

Apr. 9, 2002 (JP) .................................... 2002-106251

(51) Int. Cl.[7] ............................................. G06F 19/00
(52) U.S. Cl. .................................... 700/193; 700/160
(58) Field of Search ............................. 700/170, 184, 700/191, 192, 193

(56) References Cited

U.S. PATENT DOCUMENTS

| | | | |
|---|---|---|---|
| 3,731,175 A | 5/1973 | Harlung | |
| 4,061,952 A | * 12/1977 | Dinsdale et al. | 318/572 |
| 4,881,021 A | * 11/1989 | Hirai | 318/569 |
| 5,210,478 A | * 5/1993 | Sasaki et al. | 318/632 |
| 5,260,879 A | * 11/1993 | Sasaki et al. | 700/193 |
| 5,568,028 A | * 10/1996 | Uchiyama et al. | 318/566 |
| 5,740,058 A | * 4/1998 | Bergamini et al. | 700/185 |
| 6,038,489 A | * 3/2000 | Pickles et al. | 700/164 |
| 6,625,498 B1 | 9/2003 | Kurakake et al. | |
| 2001/0029404 A1 | * 10/2001 | Sugiyama et al. | 700/160 |

FOREIGN PATENT DOCUMENTS

| | | |
|---|---|---|
| EP | 1 052 560 | 11/2000 |
| EP | 1 163 978 | 12/2001 |
| JP | 3-296109 | 12/1991 |
| JP | 07-302103 | 11/1995 |
| JP | 11-327624 | 11/1999 |
| JP | 2000-181525 | 6/2000 |
| JP | 2001-27904 | 1/2001 |
| WO | 00/39646 | 7/2000 |

* cited by examiner

*Primary Examiner*—Albert W. Paladini
*Assistant Examiner*—Carlos R. Ortiz
(74) *Attorney, Agent, or Firm*—Staas & Halsey LLP

(57) ABSTRACT

A numerical controller capable of driving a controlled axis in synchronism with a reference axis at a desired speed not restricted by a speed of the reference axis in a path table operation and capable of performing auxiliary function, spindle function and tool wearing compensation function, and changing a position of starting the path table operation of the controlled axis. Data tables are provided storing command positions of controlled axes to be associated with positions of the reference axis and for the auxiliary, spindle and tool wearing compensation functions. The number of pulses of a reference pulse signal from the reference axis is counted and multiplied by an override scale factor and the result is stored in a reference position counter. The controlled axes are driven based on command positions of the controlled axes determined based on the reference position counter, referring to the path and function data tables.

5 Claims, 6 Drawing Sheets

| j | SET REFERENCE POSITION | COMMANDED POSITION | ATTRIBUTE | INCLINATION |
|---|---|---|---|---|
| 0 | 0 | X0 | 0 | |
| 1 | S1 | X1 | 1 | F1 |
| 2 | S2 | X2 | 0 | |
| 3 | S3 | X3(=X2) | 0 | |
| 4 | S4 | X4 | 0 | |
| 5 | S5 | X5(=X4) | 4 | |
| 6 | −1 | | | |

Tx

| i | SET REFERENCE POSITION | COMMAND |
|---|---|---|
| 0 | 0 | T01 |
| 1 | SP1 | M11 |
| 2 | SP2(=S3) | T02, S10000 |
| 3 | −1 | |

T0

NUMERICAL CONTROLLER

BACKGROUND OF THE INVENTION

1. Field of the Invention

The invention relates to a numerical controller for controlling an industrial machine such as a machine tool and a manufacturing machine, and in particular to a path-table operation, i.e. so-called electronic cam control in which axes of the machine are controlled to be synchronized by the numerical controller.

2. Description of Related Art

As a method of drivingly controlling axes of a machine in synchronism with motion of a reference axis, there is known a path-table operation, i.e. so called "electronic cam control", in which each of the controlled axes is driven in synchronism with the reference axis based on a path-table operation data table storing information on command positions of controlled axes with respect to positions of the reference axis, from Japanese Laid-Open Patent Publication Hei 3-296109, for instance. A spindle or an external axis of a machine tool is designated as the reference axis, and a present position of the reference axis is determined based on a pulse signal from a position coder provided at the spindle or an external pulse signal from the external axis. The synchronized operation of the controlled axes with the reference axis is performed by determining a command position of each of the controlled axes for the present position of the reference axis based on the information on command position of the controlled axis for the position of the reference axis stored in the path-table operation data table prepared for each controlled axis, and driving each of the controlled axes to the command position.

In the above-mentioned conventional path-table operation (electronic cam control), the speed of each controlled axis is fixedly determined in accordance with the rotating speed of the reference axis, and cannot be altered. However, in general, prior to actual machining with the machine tool, motions of the axes are checked with the spindle as the reference axis not connected to a workpiece to be idle, and increasing or decreasing feed rates of controlled axes of an X-axis and a Z-axis. Further, under some machining conditions, the feed rates of controlled axes may be changed even during actual machining.

Also, in the pass-table operation (electronic cam control), it is desirable that the speed of controlled axes is changeable as mentioned above. However, conventionally, the speed of controlled axes depends on the speed of a spindle (reference axis) and cannot be changed.

Further, generally, a machine tool has auxiliary functions such as starting or stopping supply of cutting fluid, and spindle functions such as changing the rotating speed of the spindle, etc., and is operated using those auxiliary functions and spindle functions. However, in the conventional path-table operation (electronic cam control), the auxiliary functions and spindle functions cannot be used to be inconvenient for users.

Further, in the conventional path table operation (electronic cam control), it is inconvenient that data in a path-table operation data table are required to be changed when a tool wears.

Furthermore, it is inconvenient that relative position of the reference axis and the controlled axes need to be determined on the basis of a fixed position, and respective positions of start of the path-table operation of the controlled axes need to be determined on the basis of the fixed position in advance.

SUMMARY OF THE INVENTION

An object of the invention is to solve the above-mentioned inconveniences and problems in the conventional path table operation (electronic cam control).

A numerical controller of the present invention comprises: reference-axis position determining means for determining a position of a reference axis based on reference pulses representing motion of the reference axis; override means for setting a scale factor for override; reference position calculating means for obtaining a reference position by multiplying a value representing the position of the reference axis determined by the reference-axis position determining means by the scale factor set by the override means; a data table for storing information on a command position of the controlled axis corresponding to the reference position; and control means for drivingly controlling the controlled axis according to the command position of the controlled axis determined based on the reference position determined by the reference position determining means and the information stored in the data table. With the above arrangement, the controlled axis can be driven in synchronism with the reference axis at a speed not restricted by a speed of operation of the reference axis.

In the data table, commands for an auxiliary function and a spindle function, a command for a tool wearing compensation function, and a command of re-setting a coordinate system of the controlled axis may be stored to be associated with the reference position, so that these functions are performed at respective designated reference positions.

DETAILED DESCRIPTION OF THE PREFERRED EMBODIMENTS

Figure 1:
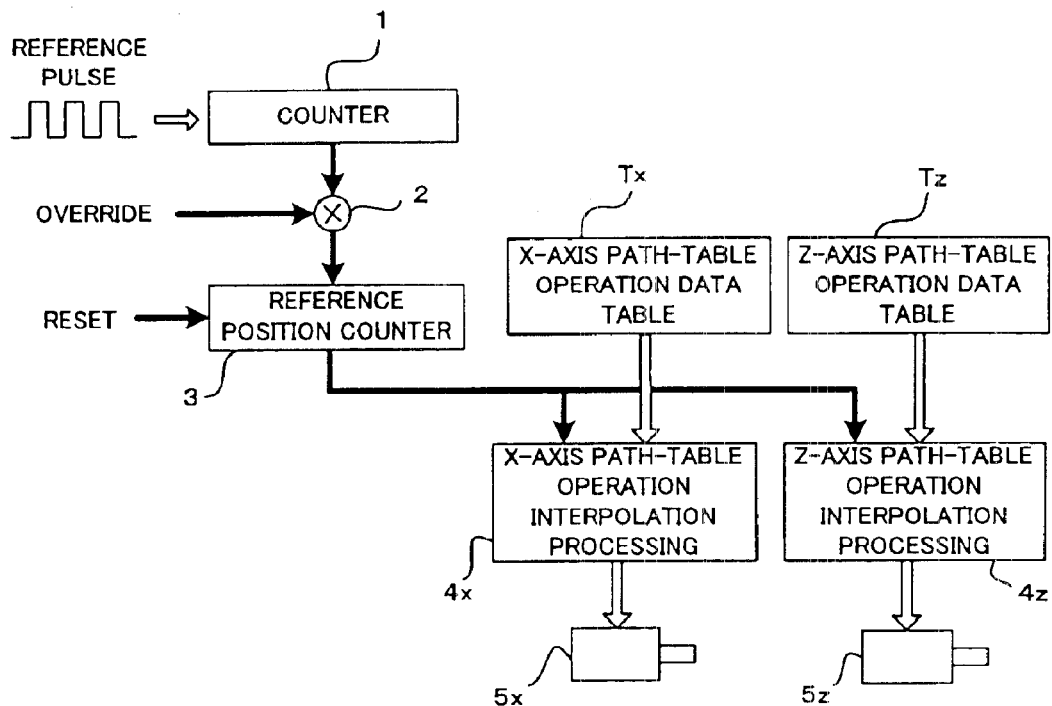
FIG. 1 is a functional diagram schematically showing a path table operation process performed by a numerical controller according to an embodiment of the present invention.

FIG. 1 is a functional diagram of a path-table operation according to an embodiment of the invention. In FIG. 1, a reference pulse signal representing motion of a reference axis, such as a pulse signal from a position coder provided at a spindle or from an external reference pulse generator, is inputted to a counter 1 and the number of pulses of the reference pulse signal is counted by the counter 1 at every predetermined processing period (ITP). A multiplier 2 multiplies the number of pulses counted by the counter 1 by a scale factor set by override means, and result of the multiplication is stored in a reference position counter 3. The reference position counter 3 is reset when a path-table operation function is commanded or when a one-rotation signal is issued from the position coder for the reference axis for the first time after a path-table operation function is commanded. Thus, the reference position counter 3 stores the position of the reference axis altered by the multiplication by the override factor.

The value of the reference position counter 3 (hereinafter referred to as "reference position") is respectively inputted to path-table operation interpolation sections 4x, 4z provided for respective controlled axes (in the present embodiment, X-axis and Z-axis). Referring to path-table operation data tables Tx, Tz stored in a memory for the respective controlled axes, respective command positions of the controlled axes with respect to the reference-axis position are obtained, and motion commands of a difference between the command position obtained in the present processing period and the command position in the last processing period are outputted to motors 5x, 5z for the controlled axes respectively.

The path-table operation is performed as above. Thus, when the scale factor set by the override means is "1", the number of pulses of the reference pulse signal counted by the counter 1 is stored in the reference position counter 3 as the reference position, and the controlled axes are operated in synchronism with the reference axis in the same manner as the conventional manner. If the reference pulse signal is generated by a position coder attached to the spindle, the controlled axes (X-axis and Z-axis) move in synchronization with the spindle and also in synchronization with each other. When the scale factor is changed by the override means to, for example, "0.5", the controlled axes move at a speed which corresponds to half the rotating speed of the spindle. Thus, by changing the value of the override factor, the controlled axes (X-axis and Z-axis) can be driven in the path-table operation in synchronism with the reference axis (spindle), at a desired speed not restricted by the speed of the reference axis.

Figure 2:
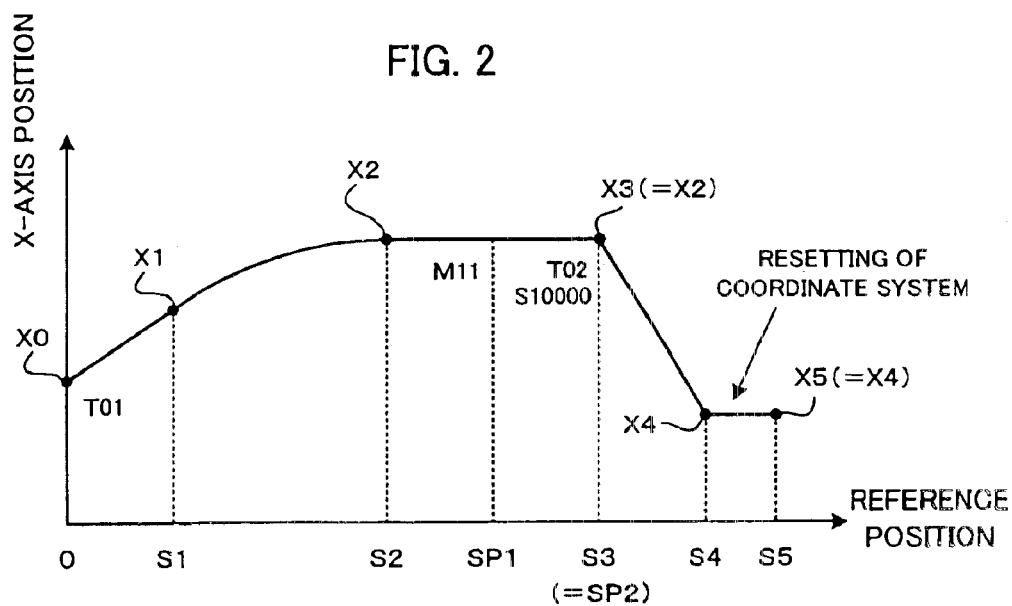
FIG. 2 is a diagram of a motion pattern of a controlled axis based on a path-table operation data table shown in FIG. 3.
Figure 3:
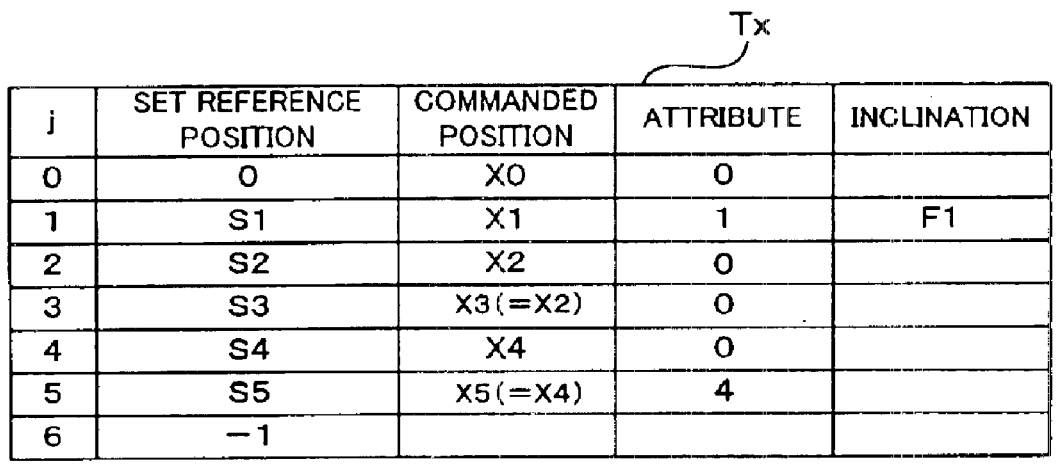
FIG. 3 is an example of a path-table operation data table.

FIG. 3 shows an example of a path-table operation data table Tx for the X-axis. FIG. 2 is a diagram showing how the position of the X-axis changes with the reference position S when the X-axis is driven in path-table operation using the X-axis path-table operation data table Tx. In the table of FIG. 3, predetermined values of the reference position S which is based on values of the reference position counter 3 are stored, and command positions of the X-axis and attributes for the set positions of the reference-axis are stored. An attribute can be selected from among path connection patterns and re-setting of the coordinate system according to the present invention. The respective meanings of attribute codes are as follows:

| Attribute code | Meaning |
| --- | --- |
| 0 | Linear connection |
| 1 or 2 | Quadratic curve connection |
| 3 | Cubic curve connection |
| 4 | Re-setting of the coordinate system |

Liner connection represented by code "0" means that the start position (end position of the last connection) and the end position should be connected linearly. Code "1" or "2" means that the start position (end position of the last connection) and the end position should be connected by a quadratic curve. Code "3" means that the start position (end position of the last connection) and the end position should be connected by a cubic curve. In the quadratic curve connection represented by code "1" or "2", the inclination Fs at either the start position or the end position needs to be set. In the cubic curve connection represented by code "3", the inclination Fs at the start position and the inclination Fe at the end position need to be set. In the re-setting of the coordinate system represented by code "4", the path table operation start position, that is, the position of the controlled axis (X-axis) corresponding to reference position S0=0 is changed, and the controlled axis (X-axis) is operated starting from the changed position, in accordance with a movement pattern determined by the path-table operation data table. In the re-setting of the coordinate system, the position of the controlled axis at that time is regarded as the position corresponding to reference position S0=0, and the controlled axis is not actually moved. This makes it possible to start the path-table operation of the controlled axis from a desired position.

Since the connection patterns and re-setting of the coordinate system mentioned as attributes have already been put into practice and known to the public, the connection patterns will be explained only briefly.

Assuming that the set reference position predetermined as corresponding to the start position is Ss, the start position of the controlled X-axis is Xs, the reference position predetermined as corresponding to the end position is Se, and the end position of the controlled X-axis is Xe. In the case of linear connection, position X of the controlled X-axis corresponding to the reference position S is expressed by the following equation (1).

$$X=[(S-Ss)\cdot(Xe-Xs)/(Se-Ss)]+Xs \qquad (1)$$

In the case of quadratic curve connection, if the inclination Fs at the start position is set, position X is expressed by the following equation (2).

$$X=(\tfrac{1}{2})\cdot((Fe-Fs)/(Se-Ss))\cdot(S-Ss)^2+Fs(S-Ss)+Xs \qquad (2)$$

where, Fe=2·((Xe−Xs)/(Se−Ss))−Fs
In the case of cubic curve connection, position X is expressed by the following equation (3).

$$X=(\tfrac{1}{6})\cdot((Ae-As)/(Se-Ss))\cdot(S-Ss)^3+(\tfrac{1}{2})\cdot As(S-Ss)^2+Fe(S-Ss)+Xs \qquad (3)$$

where, when S equals Se, F equals Fe and X equals Xe. From here, accelerations As and Ae can be obtained.

Coming back to the path-table operation data table Tx in FIG. 3, assuming that the controlled X-axis is placed at its command position X0 corresponding to the set reference position S0=0, before the path-table operation is started. As will be described later, it is arranged that if the controlled X-axis is not placed at position X0, an alarm is issued.

It is to be noted that "−1" stored in the column "reference position, the last row of the path-table operation data table Tx represents the end of the table data.

FIG. 2 is a diagram showing a pattern of motion of the X-axis based on the data stored in the path-table operation data table Tx shown in FIG. 3.

The X-axis is positioned at a coordinate position X0. When a path-table operation command is issued and the reference position S stored in the reference position counter 3 becomes "0", command position X0 and attribute "0" associated with the set reference position S0=0 are read from the table Tx. Since the attribute "0" means the linear connection, position X0 and command position X1 associated with the next set reference position S1 are connected linearly. When the reference position S becomes S1, command position X1, attribute "1" and inclination F1 associated with the set reference position S1 are read from the table Tx, and position X1 and command position X2 associated with the next set reference position S2 are connected by a quadratic curve.

When the reference position S becomes the set reference position S2, position X2 and command position X3 associated with the next set reference position S3 are connected linearly according to the attribute "0". In this case, however, since position X3 equals position X2, the X-axis does not move. In the same manner, the position X3 and the position X4 are connected linearly. When the reference position S becomes S5, a command position X5 and an attribute "4" associated with the set reference position S5 are read from the table Tx. Since the attribute "4" means re-setting of the coordinate system, a new coordinate system is set, in which the present position X5 of the controlled axis is regarded as the position corresponding to the set reference position S0=0. This means that the X-axis movement pattern shown in FIG. 2 is so shifted that it starts from position X5. The shift amount (X5–X0) is stored. In the subsequent path-table operation, positions resulting from shifting the command positions stored in the path-table operation data table Tx by the above shift amount are used as command positions. It is to be noted that in the re-setting of the coordinate system, a controlled axis does not move. Thus, in the example to which FIGS. 2 and 3 relate, X5 equals X4.

The path-table operation is performed on the controlled axes based on their respective path-table operation data tables Tx, Tz in the above-described manner. In the path-table operation, even when the speed of change of the reference-axis position is changed by the override means, the controlled axes can perform their respective movements determined by their respective path-table operation data tables Tx, Tz, in synchronism with each other.

Figure 4:
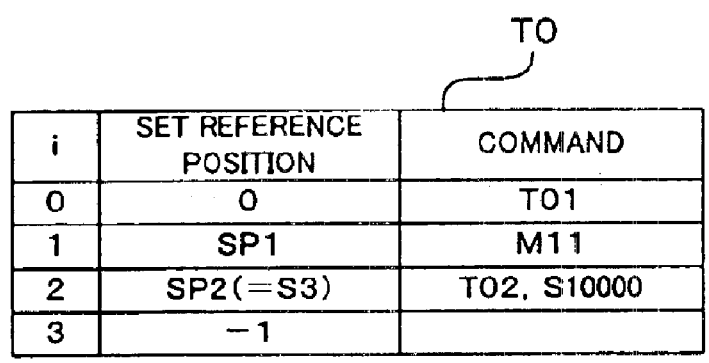
FIG. 4 is an example of a function data table.

The present embodiment can further perform auxiliary function, spindle function and tool wearing compensation function. In order to perform these functions, the present embodiment has another data table, namely, a function data table T0, in addition to the path-table operation data tables. As shown in FIG. 4, in the function data table T0, M-codes which represent auxiliary function, S-codes which represent spindle function, and T-codes which represent tool function are stored in a manner connected with reference positions, that is, predetermined values of the reference position S. When this type of path table operation is started, a T-code which represents a tool that has been used so far to perform machining programs is stored in the command column of the function data table T0, in the row relating to the set reference position S0=0, from which position the path-table operation using the function data table T0 should be started. In the example shown in FIG. 4, T01 is stored.

Auxiliary function code M11 (cramp command) is stored, in a manner connected with the set reference position SP1. When the reference position S becomes SP1, auxiliary function code M11 is outputted, as shown in FIG. 2. Tool code T02 and spindle function code S10000 are stored, in a manner connected with the set reference position SP2(=S3). Thus, when the reference position S becomes SP2(=S3), spindle function code S10000 is outputted as shown in FIG. 2 and a difference in wearing compensation amount between tool code T01 read in the preceding processing period and tool code T02 read in the present processing period is outputted to all the controlled axes.

The above is an outline of the operation of the numerical controller according to the embodiment of the present invention.

Figure 5:
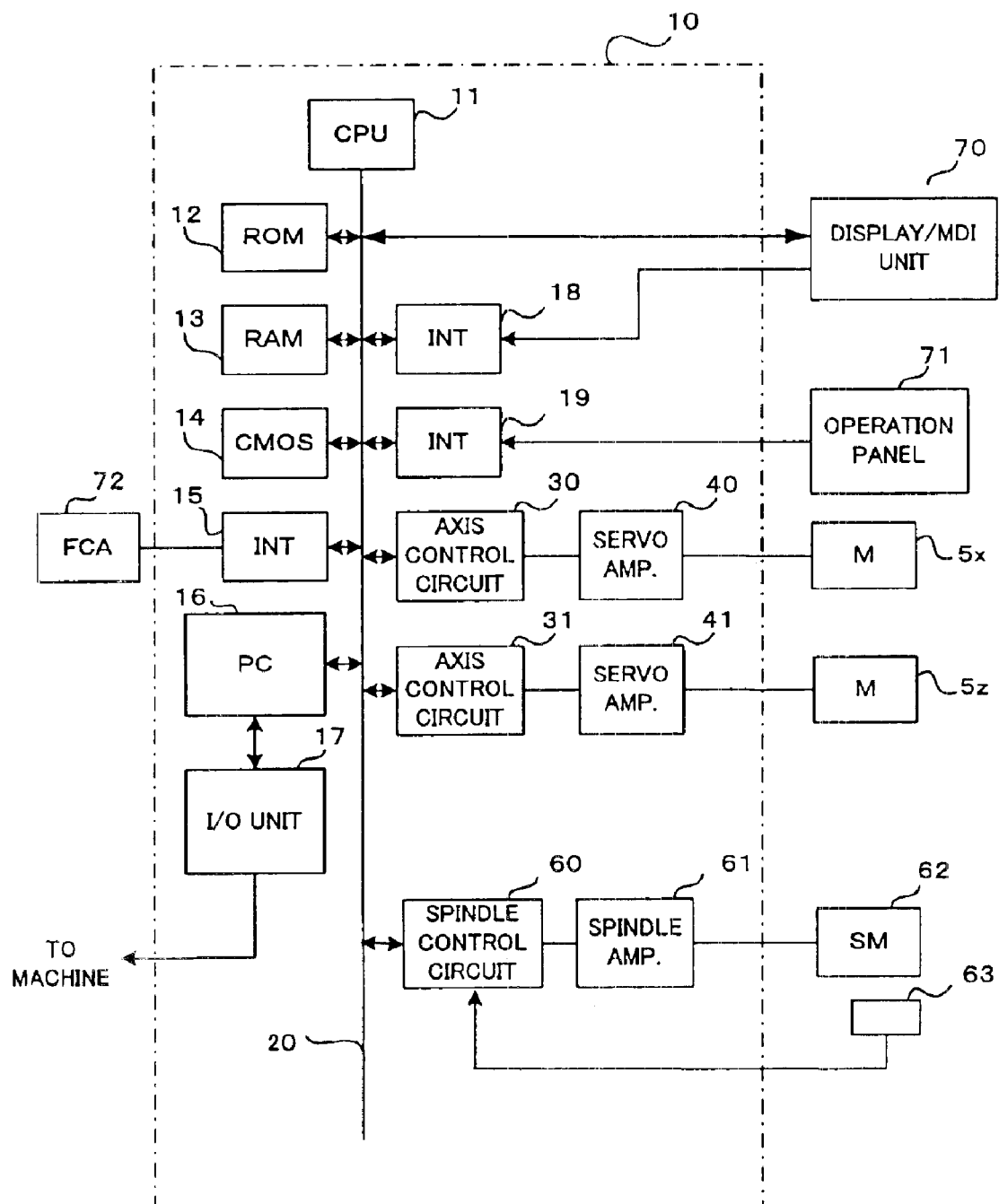
FIG. 5 is a block diagram of principal parts of a numerical controller according to the embodiment of the invention.

FIG. 5 shows relevant parts of a numerical controller 10 for performing the path-table operation according to an embodiment of the invention. A CPU 11 is provided as a processor for generally controlling the numerical controller 10. The CPU 11 reads a system program stored in a ROM 12 through a bus 20 and generally controls the numerical controller in accordance with the system program. A RAM 13 is provided for storing temporary calculation data, display data and data of various kinds inputted by an operator through a CRT/MDI unit 70. A CMOS memory 14 is a nonvolatile memory backed up by a battery (not shown) to retain stored data even when a power supply to the numerical controller 10 is turned off. Machining programs loaded through an interface 15 or inputted through the CRT/MDI unit 70 are stored in the CMOS memory 14. The above-described path-table operation data tables Tx, Tz and function data table T0 are also stored in the CMOS memory 14. In the ROM 12, various programs for edit-mode processing for creating and editing machining programs and for automatic operation of the machine are stored in advance.

The interface 15 connects the numerical controller 10 to external devices 72 such as an adaptor. Machining programs edited in the numerical controller 10 can be stored in external storage means through the external devices 72. A PC (programmable controller) 16 controls auxiliary devices of the machine tool by outputting signals to them through an I/O unit 17 in accordance with sequence programs stored in the numerical controller 10. Further, the PC 16 receives signals from various switches on an operation panel provided at a body of the machine tool, performs necessary signal processing on them, and outputs them to the CPU 11.

The CRT/MDI unit 70 is a manual data input unit provided with a display, a keyboard, etc. An interface 18 receives commands and data from the keyboard of the CRT/MDI unit 70 and outputs them to the CPU 11. An interface 19 is connected to an operation panel 71 and receives various commands from the operation panel 71.

Axis control circuits 30, 31 for respective axes receive motion commands of their respective axes from the CPU 11, and output commands for the respective axes to servo amplifiers 40, 41. Upon receipt of those commands, the servo amplifiers 40, 41 drive servo motors 5x, 5z for the respective axes. Each of the servo motors 5x, 5z has a position/speed detector. The servo motors 5x, 5z perform position/speed feedback control by feeding position/speed feedback signals from their respective position/speed detectors back to their respective axis control circuits 30, 31. The position/speed feedback is not shown in FIG. 5.

A spindle control circuit 60 receives a spindle rotation command, and outputs a spindle speed signal to a spindle amplifier 61. Based on the spindle speed signal, the spindle amplifier 61 drives a spindle motor 62 at a rotating speed commanded by the spindle speed signal. A position coder 63 feeds back a pulse signal (reference pulse signal) and a one-rotation signal in synchronism with rotation of the spindle motor 62 to the spindle control circuit 60 for performing a speed control of the spindle. The feedback pulse signal (reference pulse signal) and the one-rotation signal are read by the CPU 11 through the spindle control circuit 60, and the number of pulses of the feedback pulse signal (reference pulse signal) is counted and stored in a counter provided in the RAM 13 (which corresponds to the counter 1 in FIG. 1).

The foregoing embodiment is an example where the feedback pulse signal from the position coder provided to the spindle is a reference pulse signal, the spindle is a reference axis, and the X- and Z-axes are controlled axes. It is a matter of course that the number of controlled axes may be more than two. In that case, pass-table operation data tables for additional controlled axes are stored in the nonvolatile memory, and axes control circuits, servo amplifiers and servo motors for the additional controlled axes are added. Further, the reference axis may be an external axis in place of the spindle, and the reference pulse signal may be a pulse signal which is generated as the external axis moves. In that case, a counter for counting the number of pulses of this pulse signal needs to be provided.

In the discussed embodiment, path-table operation data tables Tx, Tz provided for the controlled X- and Z-axis separately, which are like the table shown in FIG. 3, and a function data table T0 like the table shown in FIG. 4 are stored in the nonvolatile memory 14 as data tables.

Figure 6:
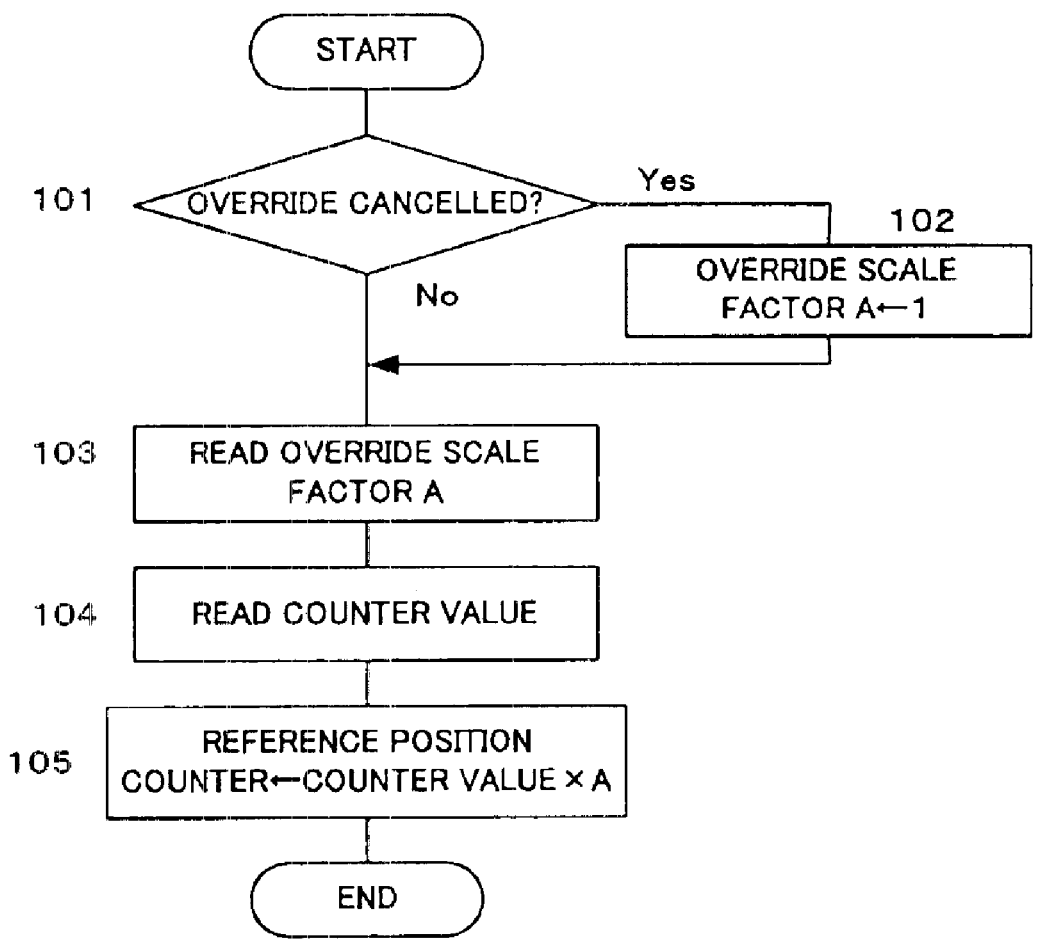
FIG. 6 is a flowchart of processing for obtaining a reference position by multiplication of a position of the reference axis by an override factor.

A machining program stored in the nonvolatile memory 14 is executed, while the CPU 11 performs processing shown by a flowchart of FIG. 6, which relates to the present invention, at every predetermined processing period.

First, it is determined whether or not an override cancel signal is commanded by a machining program, the operating panel 71 or MD 170 (Step 101). If an override cancel signal has not been issued, the procedure proceeds to Step 103. If an override cancel signal has been issued, the override scale factor "A" which has been set is set at "1" (Step 102), and then the procedure proceeds to Step 103. In Step 103, the override scale factor "A" is read from a register which is provided for storing the override scale factor. Then, from the counter which counts the number of pulses of the reference pulse signal, the counted number of pulses is read (Step 104). Then, the value resulting from multiplying the value of the counter by the override scale factor A is stored in the reference position counter (Step 105). The processing from Step 101 to Step 105 is performed at each predetermined period.

Figure 7:
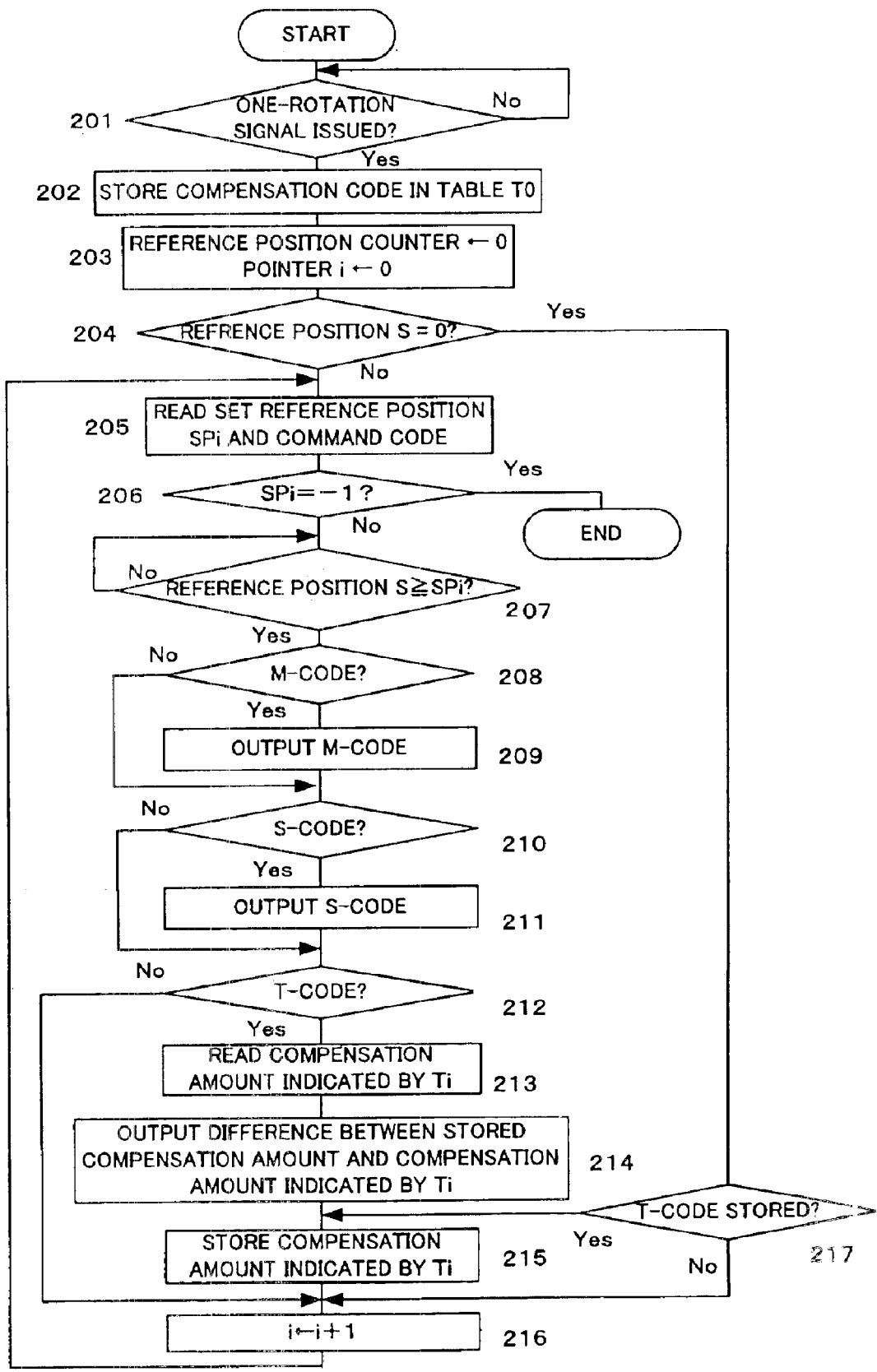
FIG. 7 is a flowchart of processing for performing an auxiliary function, a spindle function and a tool wearing compensation function in the path-table operation using the function data table.
Figure 8:
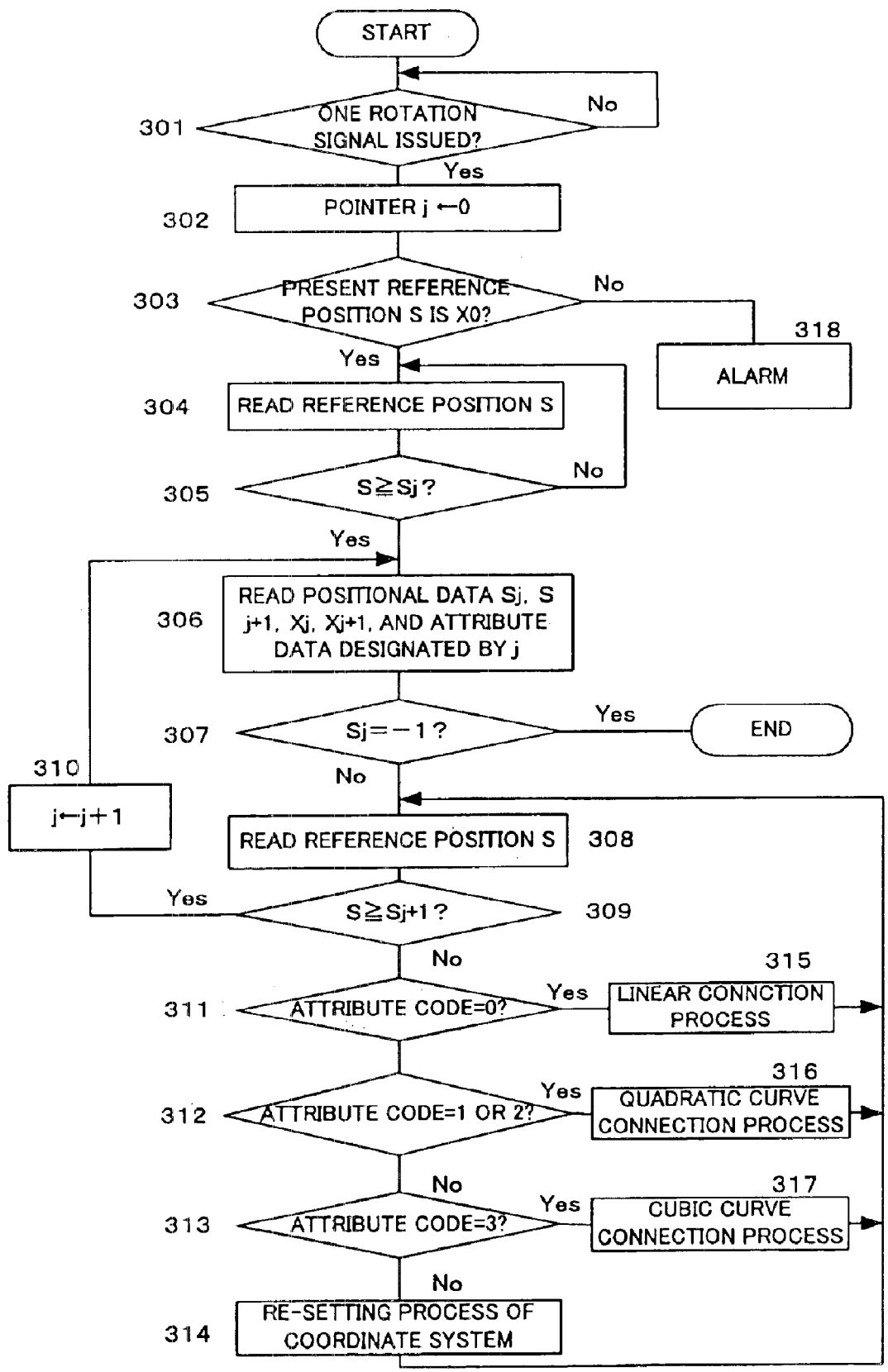
FIG. 8 is a flowchart of processing for synchronizing the controlled axis with the reference axis in path-table operation.

When a path table operation command is read from a machining program, the CPU performs processing shown in FIG. 7 and processing shown in FIG. 8 at every predetermined period, where the processing shown in FIG. 7 using the function data table T0 is performed prior to the processing shown in FIG. 8 concerning the controlled axes.

First, referring to FIG. 7, how the auxiliary function, spindle function, and tool wearing compensation function are performed on the basis of the function data table T0 will be described.

When a path-table operation command is read from a machining program, the process shown in FIG. 7 is performed at every predetermined period. First, it is determined whether or not a one-rotation signal is issued from the position coder 63 (Step 201). The CPU 11 waits until the one-rotation signal is issued. When the one-rotation signal is issued, if a T-code for tool compensation has been given by the machining program, a compensation code of the given T-code is written in the command column of the function data table T0 at the row for the set reference position S0 (Step 202). Then, the reference position counter is reset, and a pointer i indicating a row of the function data table T0 to be read is set at "0" (Step 203).

Then, the reference position S, which is the value of the reference position counter, is read, and it is determined whether or not the reference position S is "0" (Step 204). At first, since the reference position counter has been reset to "0" in Step 203, the procedure proceeds to Step 217 where it is determined whether or not a T-code has been stored in the command column at the row of reference position SP0=0 where the reference position S is 0. If the tool compensation has been already performed and thus it is determined that a T-code is stored in the above-mentioned row at Step 202, a wearing compensation amount corresponding to the T-code is stored in a register (Step 215) and the procedure proceeds to Step 216. If a T-code is not stored, the procedure proceeds from Step 217 to Step 216. In Step 216, the value of the pointer i is incrementally increased by "1". Then, the procedure returns to Step 205.

In Step 205, set reference position SPi indicated by the pointer i and stored at i-th row of the function table T0 is read, and it is determined whether or not the set position SPi is of "−1" (Step 206). If the set position SPi is of "−1", it means that the function table T0 includes no more data. Thus, the processing of FIG. 7 terminates.

If the set position SPi is not "−1 ", it is determined whether or not the reference position S read from the reference position counter is equal to or greater than the set reference position SPi read at Step 205. The CPU 11 waits until the value of the reference position S increases to reach the set reference position SPi (Step 207). It is to be noted that here, it is assumed that the spindle is rotated in a forward direction. If the spindle is rotated in a reverse direction, it is determined whether or not the reference position S read from the reference position counter is equal to or lower than the reference position SPi read at Step 205. When the value of the reference position S reaches the reference position SPi, it is determined which of an M-code, an S-code and a T-code is stored in the command column of the function data table T0, in the row indicated by the pointer i (Steps 208, 210, 212). If an M-code is stored, a command corresponding to the M-code is outputted to an auxiliary device or the like through the PC 16 and the I/O unit 17 (Step 209). If an S-code is stored, the CPU 11 outputs a command corresponding to the S-code to the spindle control circuit 60 (Step 211).

If a T-code is stored, a wearing compensation amount designated by the stored Ti code is read (Step 213), and a difference between the wearing compensation amount read this time and the wearing compensation amount stored in the register is obtained. Then, the obtained difference is outputted to all the controlled axes (Step 214). Then, the compensation amount obtained in Step 213 is stored in the register (Step 215), the value of the pointer i is incrementally increased by "1 " (Step 216), and the procedure returns to Step 205. Then, until "−1" is read as reference position SPi in Step 206, the processing from Step 205 to Step 216 is performed as an interrupt performance in each predetermined period. When "−1" is read as reference position SPi, the process of performing the auxiliary function, spindle function and tool wearing compensation function in the path table operation using the function data table T0 terminates.

Regarding the controlled axes, the processing shown in FIG. 8 is performed in each predetermined period. FIG. 8 is an example in which the processing is performed on the X-axis as a controlled axis. The like process is performed on the Z-axis which is another controlled axis, of which an explanation will be omitted.

When a path table operation command is read from a machining program, processing shown in FIG. 8 is performed at every predetermined period. The CPU 11 waits until a one-rotation signal is issued from the position coder 63 (Step 301). When a one-rotation signal is issued, a pointer "j" is set to "0" (Step 302), and it is determined whether or not the present position of the controlled X-axis is the path-table operation start position X0(=Xj) which is set for position Sj=0 of the reference axis in the path-table operation data table Tx (Step 303). Normally, the position of the X-axis is set at the path table operation start position X0 before a path table operation command is issued. However, if the position of the X-axis is not set at the path table operation start position X0, an alarm is given and the path table operation is not commenced (Step 318).

If it is determined that the X-axis is placed at the path-table operation start position X0, the reference position S which is the value of the reference position counter is read, and it is determined whether or not the reference position S is at least equal in value to reference position Sj (=S0=0) stored in that row of the path-table operation data table Tx which is pointed by the pointer j (Step 304, 305). Normally, the process shown in FIG. 7 is performed prior to the processing shown in FIG. 8, and the reference position counter is reset to "0" in Step 203 in FIG. 7. Thus, the reference position S read in Step 304 is "0", and the determination result in Step 305 is Yes.

Next, set reference position Sj, command position Xj and attribute code stored in the row of the path-table operation data table Tx, which are designated by the value of the pointer "j", and set reference position Sj+1 and command position Xj+1 stored in the next row "j+1" are read (Step 306). Then, it is determined whether the set reference position Sj is "−1" or not (Step 307). If the set reference position Sj is determined to be "−1", the procedure terminates. If the set reference position Sj is not determined to be "−1", the reference position S which is the value of the reference position counter is read (Step 308), and it is determined whether or not the read reference position S is equal to or greater than the next set reference position Sj+1 (Step 309).

At the beginning of the processing, the read reference position S does not reach the next set reference position Sj+1, and it is determined the attribute code in the row of the table Tx indicated by the value of the pointer j which is read in Step 306 is "0", "1 or 2", "3" or "4" (Steps 311, 312 and 313). If the attribute code is "0", liner connection is performed (Step 315). Specifically, the command position X corresponding to the reference position S is obtained by calculating the above-mentioned equation (1) using the set reference positions Sj, Sj+1 and the command positions Xj, Xj+1 which have been read in Step 306 and the reference position S which has been read in Step 308. Then, a difference between the command position obtained the present processing period and the command position in the last processing period is obtained and outputted to the axis control circuit 30 for the X-axis.

If the attribute code is "1 or 2 ", quadratic curve connection is performed. In this case, the command position X corresponding to the reference position S is obtained by calculating the above-mentioned equation (2), and a difference between the command position obtained in the present processing period and the command position in the last processing period is obtained and outputted to the axis control circuit 30 for the X-axis (Step 316). If the attribute code is determined to be "3", cubic curve connection is performed. In this case, the command position X corresponding to the reference position S is obtained by calculating the above-mentioned formula (3), and a difference between the command position obtained in the present processing period and the command position in the last processing period is obtained and outputted to the axis control circuit 30 for the X-axis (Step 317).

If the attribute is determined to be "4", re-setting of a coordinate system is performed (Step 314). This is to use the present position of the controlled axis as the start position of the subsequent path-table operation. The difference (Xr−X0) between the present position Xr of the controlled axis and the start position X0 of the present path table operation using the path-table operation data table Tx is stored as a shift amount.

At Step 303 in the subsequent path operation, it is determined whether or not the present position of the controlled X-axis is the start position X0 stored in the path-table operation data table Tx plus the shift amount (Xr−X0).

Then, Steps are performed in accordance with the given attribute. Specifically, if the attribute code is "0", the processing of Steps 308, 309, 311 and 315 is performed at every predetermined period. If the attribute code is "1 or 2", the processing of Steps 308, 309, 311, 312 and 316 is performed at every predetermined period. If the attribute code is determined to be "3", the processing of Steps 308, 309, 311, 312, 313 and 317 is performed at every predetermined period.

Each time the reference position S reaches the next set reference position Sj+1, the value of the pointer j is increased by "1" (Step 310), and the procedure returns to Step 306 and the processing of Step 306 and subsequent Steps is performed as described above. When "−1" which means the end of the table is read as set reference position Sj in Step 307, the path table operation terminates.

Next, an example in which the movement of the controlled X-axis shown in FIG. 2 is performed using the path-table operation data table Tx shown in FIG. 3 will be described briefly.

The position of the X-axis is set at the start position X0 of the path table operation in advance. When, in Step 305, it is determined that the reference position S has reached the path-table operation start position S0=0, data in the row j=0 of the data table Tx indicated by the value "0" of the pointer j and in the row "1"=j+1 is read (Step 306). Since the attribute stored in the row j=0 is "0", the process for liner connection, namely, calculation of the equation (1) is performed at every predetermined period, using the values S0=0, S1, X0, X1 which have been read in Step 306 and the present value S of the reference position counter (Step 315). As a result, the X-axis is moved from X0 to X1 linearly as shown in FIG. 2. When the reference position S reaches the next set reference position S1 (Step 309), values S1, S2, X1, X2, attribute "1", and inclination F1 are read (Step 306). Since the attribute is "1", the process for quadratic curve connection in Step 316 is performed at every predetermined period (Step 316). Specifically, by calculating the equation (2) using values S1, S2, X1, X2 and the present reference position S and giving a motion command at every predetermined period, the X-axis is moved from X1 to X2 describing a quadratic curve as shown in FIG. 2.

When the reference position S reaches the next set reference position S2 (Step 309), values S2, X2 in the row of the path-table operation data table indicated by the pointer j and values S3, X3((=X2) in the next row thereof are read. Also, the attribute "0" is read, and the procedure proceeds to Step 315. However, since the command position X2 stored in the row indicated by the pointer j and the next command position X3 in the next row are the same, the X-axis is not moved but remains stopped. When the reference position S reaches the next set reference position S3 (Step 309), values S3, X3(=X2), S4, X4 and the attribute "0" are read (Step 306), and process for linear connection (Step 315) is performed at every predetermined period, using these values and the present reference position S. Thus, the X-axis is moved from position X3(=X2) to the position X4 linearly as shown in FIG. 2.

When the reference position S reaches the next set reference position S4, values S4, X4, S5, X5(=X4) and the attribute "0" are read (Step 306). The attribute "0" means that X4 and X5 should be connected linearly. However, since X5 equals X4, the X-axis remains stopped. When the reference position S reaches the next set reference position S5, values S5, X5, S6=−1 and the attribute "4" are read (Step 306). Since the attribute is "4", re-setting of a coordinate system is performed (Step 314) and a shift amount (X5–X0) is obtained and stored. It is to be noted that when the attribute "4" which means re-setting of the coordinate system is given, the next command position is the same as the present command position. Thus, in the discussed example, X4 equals X5, and the controlled axis is not moved.

According to the present invention, it is possible that controlled axes are synchronized with a reference axis with their speeds changeable without being restricted by a speed of the reference axis in path table operation. This is useful in checking the movement of the controlled axes. Further, also the auxiliary function, the spindle function and the tool wearing compensation function can be performed in path table operation, and the coordinate system re-setting function enables the position of the controlled axis at the time when the coordinate system is re-set to be adopted as a start position of the controlled axis in the subsequent path-table operation.

What is claimed is:

1. A numerical controller for driving a controlled axis in synchronism with a reference axis, comprising:

reference-axis position determining means for determining a position of the reference axis based on reference pulses representing motion of the reference axis;

override means for setting a scale factor for override;

reference position calculating means for obtaining a reference position by multiplying a value representing the position of the reference axis determined by said reference axis position determining means by the scale factor set by said override means;

a data table for storing information on a command position of the controlled axis corresponding to the reference position; and control means for drivingly controlling the position of the controlled axis according to the command position of the controlled axis determined based on the reference position determined by said reference position calculating means and the information stored in said data table.

2. A numerical controller according to claim 1, wherein commands for an auxiliary function and a spindle function are stored in said data table to be associated with the reference position.

3. A numerical control unit according to claim 1, wherein a command for a tool wearing compensation function is stored in said data table to be associated with th reference position.

4. A numerical controller according to claim 1, wherein a command of re-setting a coordinate system of the controlled axis is stored in said data table to be associated with the reference position.

5. The numerical controller according to claim 1, wherein the control means adjusts a speed of the controlled axis based on the set scale factor.

* * * * *

UNITED STATES PATENT AND TRADEMARK OFFICE
CERTIFICATE OF CORRECTION

PATENT NO. : 6,885,909 B2
DATED : April 26, 2005
INVENTOR(S) : Shigeru Isohata

It is certified that error appears in the above-identified patent and that said Letters Patent is hereby corrected as shown below:

Column 10,
Line 54, change "X3((=X2)" to -- X3(=X2) --;

Column 12,
Line 4, change "erence axis" to -- erence-axis --;
Line 21, change "with th" to -- with the --.

Signed and Sealed this

Tenth Day of January, 2006

JON W. DUDAS
*Director of the United States Patent and Trademark Office*